United States Patent [19]
Collet

[11] 3,786,646
[45] Jan. 22, 1974

[54] REFRIGERATING PLANT

[75] Inventor: Peter Jacobus Collet, Voorschoten, Netherlands

[73] Assignee: Nederlandse Organisatie Voor Toegepast-Natuurwetenschappelijk Onderzoek Ten Behoeve Van Nijverheid, Handel En Verkeer, The Hague, Netherlands

[22] Filed: Oct. 12, 1972

[21] Appl. No.: 297,090

[30] Foreign Application Priority Data
Oct. 13, 1971   Netherlands...................... 7114051

[52] U.S. Cl...................... 62/115, 62/197, 62/217, 62/498
[51] Int. Cl............................................ F25b 1/04
[58] Field of Search..... 62/115, 116, 190, 498, 500, 62/197, 217; 417/78, 80, 89

[56] References Cited
UNITED STATES PATENTS

| | | | |
|---|---|---|---|
| 1,608,681 | 11/1926 | Stewart................................. | 62/500 |
| 2,073,771 | 3/1937 | Wilson.............................. | 62/500 X |
| 3,081,932 | 3/1963 | Lancey.................................. | 417/78 |
| 3,250,084 | 5/1966 | Anderson.......................... | 62/498 X |
| 3,630,641 | 12/1971 | Staueren.............................. | 417/67 |
| 3,650,636 | 3/1972 | Eskeli................................... | 417/78 |

Primary Examiner—William F. O'Dea
Assistant Examiner—Peter D. Ferguson
Attorney, Agent, or Firm—Watson et al.

[57] ABSTRACT

A refrigerating plant comprising a condenser, an evaporator and a centrifugal compressor having a rotor with radial or bent-backward solid vanes and further comprising means for controlling the head and volume-capacity of the compressor, wherein the compressor is a combination of a centrifugal compressor and a fluid vanes compressor, said solid vanes being provided with jet channels for forming liquid vanes said channels ending on the one side into slit-shaped orifices provided in the tips of the vanes and on the other side being connected to a central fluid supply provided with a flow-through control device and in operation below a pre-determined partial load of the plant, said flow-through control device is kept closed and the head and the volume-capacity of the compressor are controlled by means known per se for this purpose while operating above said pre-determined load said flow-through control device is adjusted in such a way that the head and volume-capacity of the plant will meet the requirements between the higher range of said partial load and full load.

4 Claims, 2 Drawing Figures

REFRIGERATING PLANT

BACKGROUND OF THE INVENTION

The invention relates to a refrigerating plant, comprising a condenser, an evaporator and a centrifugal compressor with a device for controlling head and volume capacity.

For such plants as they are known in the art the compressor is designed such that it meets the maximum requirements of the refrigerating plant with regard to the head and the volume capacity.

At partial load the reduction required in head can be obtained e.g. by means of a throttle valve in the compressor inlet or by application of adjustable pre-rotation vanes in the compressor inlet controlled by a temperature sensor in the space to be refrigerated. Admittedly, the latter is more complicated than the throttle valve but on the other hand it has the advantage of smaller power losses. The admissible volume capacity of the compressor is, however, tied down to a minimum value due to the occurrence of "surge." Unstable working conditions are generally inadmissible and are avoided by adding to the control device a so-called bypass valve with which a part of the refrigerant gas from the compressor outlet is fed back to the inlet.

For many refrigerating plant applications, in which the head required at partial load is considerably lower than at full load, an important drawback of these control methods is that the losses in pressure then occurring, especially in case of a throttle valve, adversely affect the compressor power required at partial load. If the maximum refrigerating capacity, so at full load, occurs only incidentally, the average consumption of energy over the whole working-time is undesirable high.

The main cause of relatively high energy consumption at partial load is that the energy transferred by the centrifugal compressor per unit of weight of gas varies little at constant speed. Accordingly, this transferred energy remains at a level that is higher than is necessary for a lower head.

It is the object of the invention to obtain a considerable decrease in the average energy consumption of a refrigerating plant, with a centrifugal compressor driven at constant speed, whose average working condition is characterized by a head value that differs considerably from the maximum value required.

THE INVENTION

The invention is characterized in that the compressor is a combination of a centrifugal compressor and a fluid vanes compressor, the vanes of the centrifugal compressor being provided with jet channels that mouth into slit-shaped orifices, provided in the tips of the vanes, and on the other end are connected with a central fluid duct provided with a flow-through control device and the housing of the compressor, besides, is shaped as for a fluid vanes compressor and is connected with a fluid reservoir.

Fluid vanes compressors are known in the art and have been greatly improved in recent years. In general they consist of a driven rotor, provided with a central fluid duct and a number of slit-shaped orifices, which rotor is surrounded by a housing radially elongated with respect to the rotor and having a central air duct and a peripheral fluid collecting part that is connected to a fluid reservoir. The energy transferred to the gas can be varied by adjusting the flow of fluid to the rotor, which adjustment in case of a refrigerating plant can be controlled by a temperature sensor in the space to be refrigerated.

Upon operating the plant according to the invention, the fluid supply duct to the jet channels is kept closed up to a certain pre-determined partial load of the refrigerating plant and the compressor operates as a conventional adiabatic centrifugal compressor, the head and the volume capacity being adjusted by the control device to the values required by the refrigerating system at partial load; above a certain partial load the fluid duct to the jet channels is opened partially to completely and the compressor operates also as a fluid vanes compressor, the head and the volume capacity of the compressor being adjusted with the aid of the flow-through control device.

Admittedly, by the same applicant a patent application was filed previously relating to my invention of a centrifugal compressor provided with a driven rotor with fixed vanes, which towards the periphery of the rotor are bent forward with respect to its direction of rotation, in the fixed vanes jet channels being provided for the formation of fluid vanes; but this construction serves to improve the unfavourable control behaviour of a centrifugal compressor with fixed bent-forward vanes. The centrifugal compressor with vanes bent-forward in its direction of rotation in itself is not suitable for application as compressor in a refrigerating plant. (Ser. No. 260,662 filed June 7,1972)

As a fluid for the supply of the fluid vanes in principle any fluid can be used. When using fluids not miscible with the refrigerant fluid of the refrigerating plant (such as water) care should be taken that compressed gaseous refrigerant medium and fluid are very completely separated.

With advantage an oil is used of the type commercially available for lubricating compressor parts may be used as vanes-fluid.

In this oil a certain percentage of refrigerant agent dissolves. By making it pass an expansion cooling vessel before entering the jet channels, the refrigerant agent dissolved in the oil can be evaporated.

With advantage use can also be made of the refrigerant fluid itself as feed for the vanes. In that case the fluid reservoir of the compressor is connected with the condenser inlet. Here, too, depending on the other conditions, application of an expansion cooling vessel in the duct of the fluid to the jet channels may be of importance to guard against boiling of the fluid upon egression of the latter from the jets and a resultant decrease in the efficiency of the operation of the fluid vanes.

In the plant according to the invention the improvement in energy consumption at low partial loads is the result of a lower maximum head when the plant operates as conventional compressor. Hence, the reduction in head at a certain partial load will be smaller, which decreases the losses in pressure as well as the consumption of energy. At high partial loads the compression efficiency will decrease in proportion as the energy transferred via the fluid increases. If, however, as is mostly the case in practice, the working-time under the condition of high partial loads is short, the increase then occurring in compression power required will exert little influence on the average energy consumption.

The boiling of the fluid at the rotor periphery may also be avoided by using refrigerant fluid from the evaporator, since at the location of the rotor periphery the vapour pressure is higher than the saturation pressure at the evaporation temperature. However, in that case a larger compression power is required, because in order to cool the refrigerant fluid from condenser temperature to evaporator temperature, by evaporation of a part of the refrigerant fluid, an additional amount of refrigerant gas is produced that is to be handled by the compressor.

It is remarked that a fan is known in the art which is provided with a blade impeller with bent-backward blades in which close to its back edges slits are provided through which a pre-compressed gas is forced.

By control of this secondary supply, the throughput of the fan is delimited.

A drawback of this control, however, is the necessity to provide the plant with an auxiliary compressor for pre-compression of the secondary gas supply. Moreover, besides the obvious disadvantage of increased installation costs, further problems arise with regard to the control of this prior art compressor, as a result of which basically the problem of control is shifted from the primary to the secondary compressor.

In the compressor according to the invention these problems are entirely avoided; the difference in pressure between compressor inlet and compressor outlet is sufficient to effect the supply of fluid to the rotor, the provision of an additional pump moreover becoming superfluous.

DESCRIPTION OF DRAWING

The invention is further elucidated with reference to a drawing.

Figure 1:
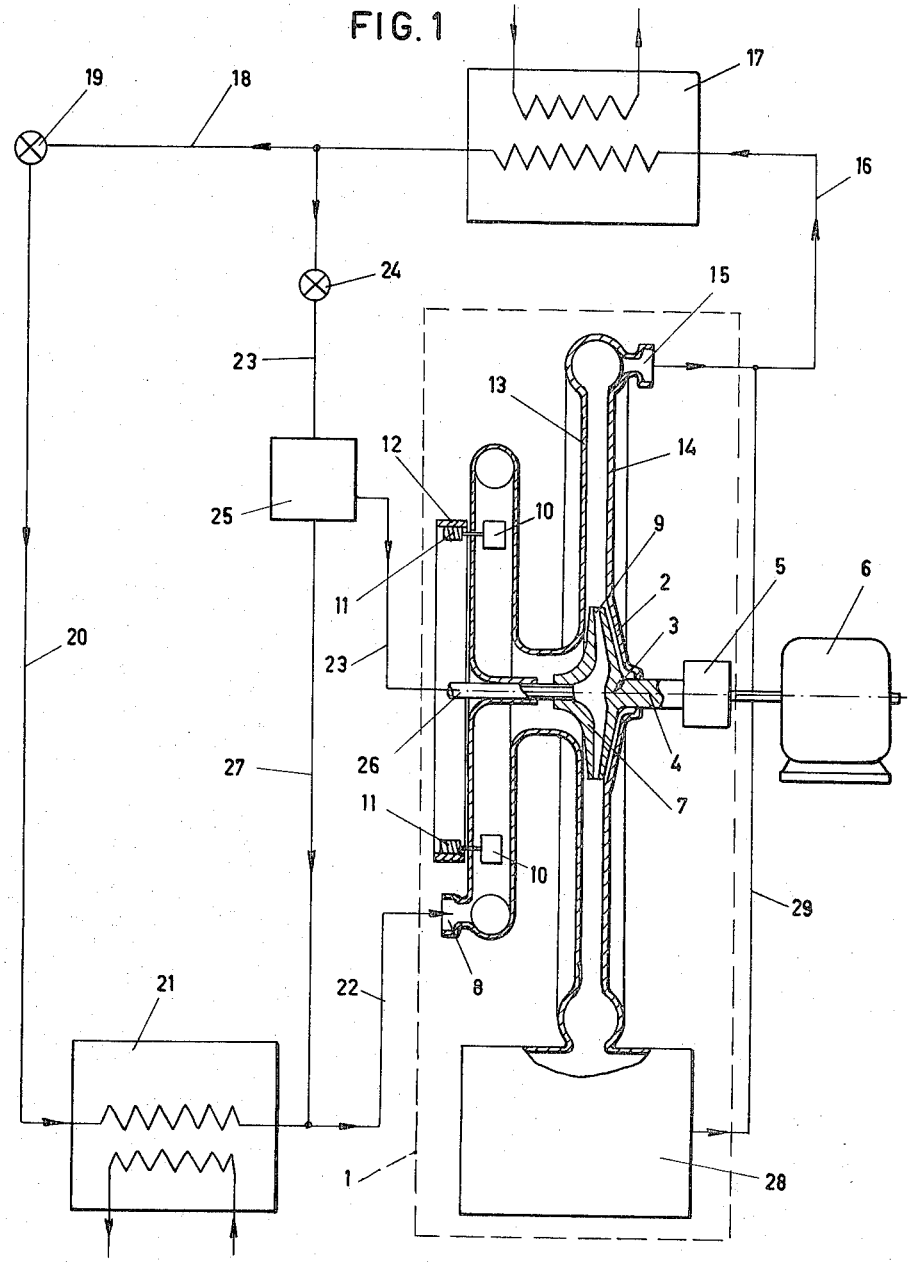
FIG.1 schematically shows an embodiment of a refrigerating plant in which the refrigerant fluid is also used as vanes fluid.
Figure 2:
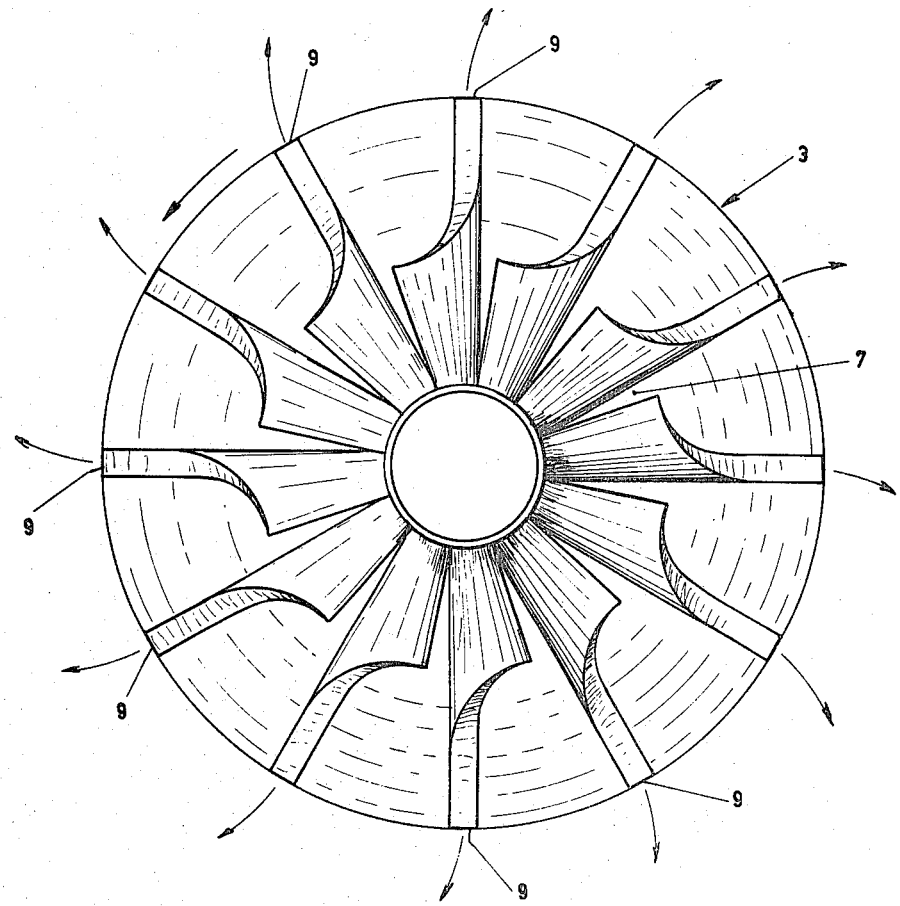
FIG.2 shows a front view of the rotor of the compressor.

In the drawing, 1 is a cooling compressor whose housing 2 surrounds a rotor 3, which is mounted on to a shaft 4 and is driven by an electromotor 6 via a coupling 5. Rotor 3 is provided with vanes 7 by means of which refrigerating gas can be sucked via compressor inlet 8. Vanes 7 externally are designed as those of a conventional adiabatic compressor and internally designed hollow in order thus to form jet channels that mouth into slit-shaped orifices 9, which are provided into the tips of the vanes. In compressor inlet 8 adjustable pre-rotation vanes 10 are provided, which, via a gear 11 appurtenant to each vane and a common planetary gear 12, are connected with a control device that is not shown in the drawing. The space within which the fluid vanes are formed and that, when the fluid supply is closed, acts as vaneless diffusor space of the compressor that then operates conventionally, is confined by walls 13 and 14.

Via compressor outlet 15 and duct 16, which serves to discharge fluid and gas, the compressed refrigerant gas is led to condenser 17 where it is condensed. Then, via duct 18, expansion valve 19 and duct 20, the refrigerant fluid is conveyed to evaporator 21, where heat is absorbed and evaporation of the refrigerating fluid takes place. Via a duct 22 the refrigerant gas produced in evaporator 21 is conveyed to compressor inlet 8.

Via the outlet of condenser 17 the refrigerating fluid is led through duct 23, in which are incorporated a control valve 24 and an expansion cooling vessel 25, to a fluid supply duct 26, which is connected with the jet channels in rotor 3. Via a duct 27 expansion cooling vessel 25 is connected to duct 22 for the discharge of the refrigerating gas produced in the expansion cooling vessel. Fluid reservoir 28 is connected directly with condenser 17 via duct 29 and duct 16.

The refrigerating plant described in this patent application can be used to advantage in plants for air-conditioning, heating-pumps and the like.

I claim:

1. A refrigerating plant comprising a condensor having an inlet and an outlet, an evaporator having an inlet and an outlet, a compressor having an intake and a discharge, first fluid conduit means intercommunicating the compressor discharge and the condensor inlet, second fluid conduit means intercommunicating the condensor outlet and the evaporator inlet, third fluid conduit means intercommunicating the evaporator outlet and the compressor intake, and means operably connected to said compressor for controlling the head and volume capacity thereof, said compressor comprising a combination centrifugal compressor and fluid vanes compressor and having a housing defining a hollow chamber and a rotor provided with radially extending vanes mounted in said chamber, said vanes including means defining jet channels directed radially outwardly of the rotor and terminating in the form of slit-shaped orifices disposed at the outer tips of the vanes, said rotor including means defining a central fluid duct communicating with said channels, there being included fourth conduit means intercommunicating the second conduit means and the fluid duct, and a flow-through control device coupled with said fourth conduit means for controlling the flow of fluid from the condensor outlet into the duct and thence through the channels and orifices, said housing including means defining a fluid reservoir communicating with said chamber.

2. A refrigerating plant as set forth in claim 1 wherein is included an expansion cooling vessel mounted in said fourth conduit means for cooling fluid flowing into said duct and through said orifices.

3. A method for operating a combination centrifugal and fluid vanes refrigeration compressor having a rotor provided with radially extending vanes including means defining jet channels directed radially outwardly of the rotor and terminating in the form of slit-shaped orifices disposed at the outer tips of the vanes and means defining a central fluid duct communicating with said channels, said method comprising:

closing said duct during periods of operation when the load on the compressor is less than a predetermined value; and opening said duct and introducing compressed and cooled refrigeration fluid thereinto and thence through the channels and the orifices during periods of operation when the load on the compressor is at said predetermined level or above.

4. A method for operating a refrigeration compressor as set forth in claim 3 wherein is included the step of controlling the amount of the compressed and cooled fluid introduced into said duct depending upon the load on the compressor.

* * * * *